Figure 1:
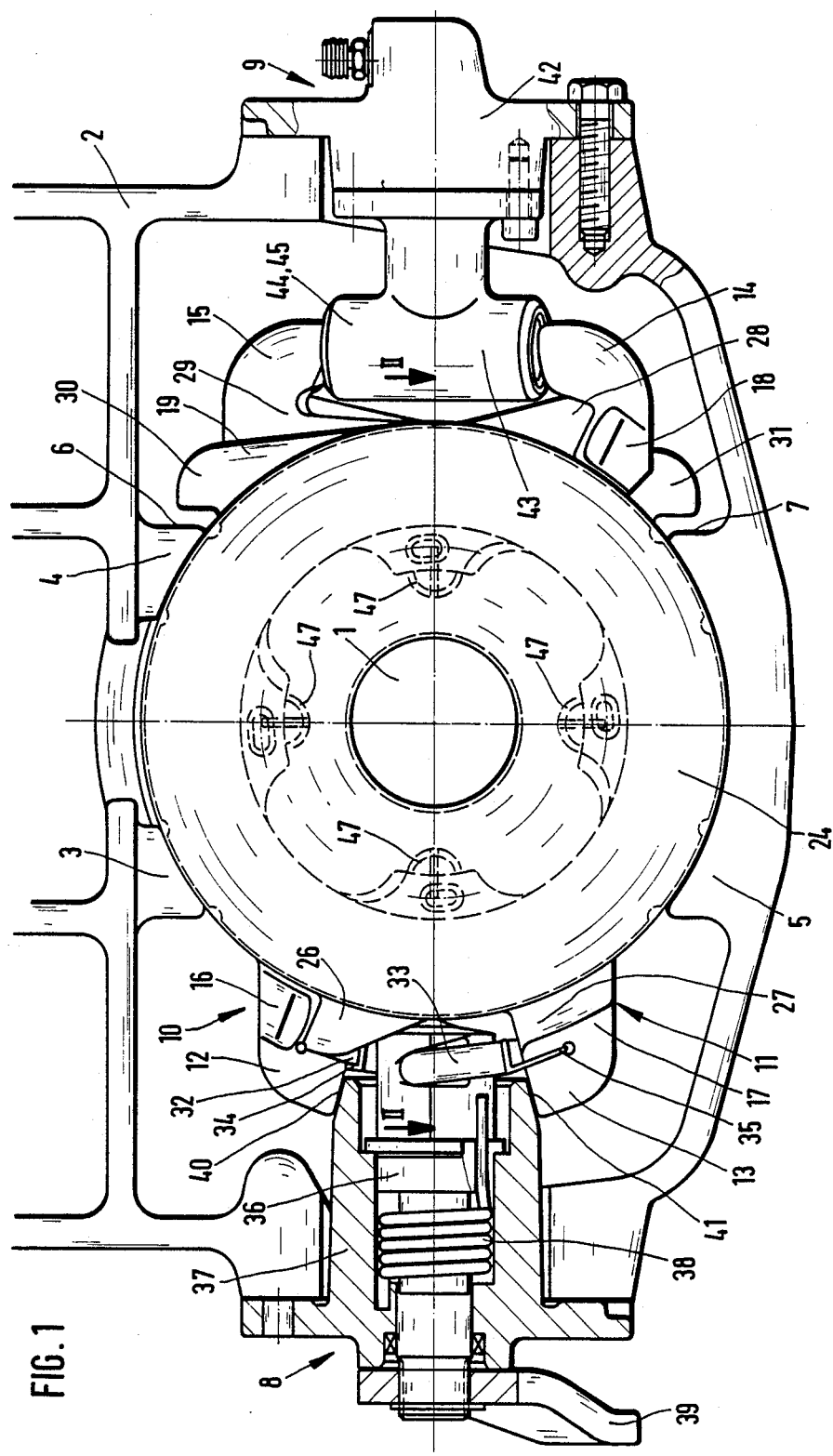

United States Patent [19]

Hillen et al.

[11] Patent Number: 4,817,763

[45] Date of Patent: Apr. 4, 1989

[54] FULL PLATE DISC BRAKE, IN PARTICULAR FOR TRACTORS

[75] Inventors: Klaus Hillen, Neuwied; Christoph Beuerle, Koblenz, both of Fed. Rep. of Germany

[73] Assignee: Lucas Industries public limited company, Birmingham, England

[21] Appl. No.: 153,100

[22] Filed: Feb. 8, 1988

[30] Foreign Application Priority Data

Feb. 12, 1987 [DE] Fed. Rep. of Germany ... 8702176[U]

[51] Int. Cl.$^4$ .................. F16D 55/14; F16D 65/16
[52] U.S. Cl. .................. 188/73.2; 188/71.4; 188/72.7; 192/70
[58] Field of Search ............ 188/73.2, 71.4, 72.8, 188/72.7; 192/70, 70.11, 70.3, 70.21

[56] References Cited

U.S. PATENT DOCUMENTS

| 3,203,507 | 8/1965 | Bond | 188/71.4 |
| 4,169,523 | 10/1979 | Malinowski et al. | 188/71.4 |
| 4,179,016 | 12/1979 | Alderman et al. | 188/71.4 |

FOREIGN PATENT DOCUMENTS 2104072 3/1976 Fed. Rep. of Germany .
1279083 2/1972 United Kingdom .

*Primary Examiner*—Andres Kashnikow
*Assistant Examiner*—Matthew C. Graham

*Attorney, Agent, or Firm*—Scrivener and Clarke

[57] ABSTRACT

In a housing (2) inner guide surfaces (3, 4, 5) and at least one first and one second stop (40, 41) fixed with respect to the housing are formed. A first and a second thrust plate (10, 11) are guided rotatably and axially displaceably at the guide surfaces (3, 4, 5) of the housing (2). Lugs (12, 13) on the thrust plates (10, 11) limit the rotation thereof in one direction of rotation by striking the first and second stop (40, 41). A first and a second set of brake discs (20, 24; 21, 25) are arranged adjacent the first and second thrust plate (10, 11). A first and a second intermediate disc (22, 23) are arranged between the brake discs (20, 24; 21, 25). Between the two thrust plates (10; 11), spreading members (46) are arranged which spread the thrust plates (10; 11) thereby initiating a braking with servo effect. Torque-transmitting connections between the thrust plates (10; 11) and the intermediate discs (22, 23) increase the servo effect. Each of the two intermediate discs (22, 23) comprises two projections (26, 28; 27, 29) which are arranged offset with respect to each other at equal angular intervals and are each associated with a projection (16, 18; 17, 19) of the associated thrust plate (10; 11) in such a manner that each intermediate disc (22, 23) can transmit to the associated thrust plate (10; 11) solely moments in the direction of rotation in which the lug (12; 13) of the respective thrust plate (10; 11) moves away from the associated stop (40; 41) fixed with respect to the housing.

7 Claims, 4 Drawing Sheets

FULL PLATE DISC BRAKE, IN PARTICULAR FOR TRACTORS

The invention relates to a full plate disc brake, in particular for tractors, comprising a housing having inner guide surfaces, at least one first and one second stop fixed with respect to the housing, a first and a second thrust plate guided rotatably and axially displaceably at the guide surfaces of the housing, a first lug on the first thrust plate which limits the rotation thereof in one direction of rotation in that it strikes the first stop, a second lug on the second thrust plate which limits the rotation thereof in the opposite direction of rotation in that it strikes the second stop, a first and a second set of brake discs which are arranged adjacent the first and second thrust plate respectively, a first and a second intermediate disc which are arranged between the brake discs of the first and second set respectively and are likewise rotatably and axially displaceably guided at the guide surfaces of the housing, at least one actuator for opposite rotation of the two thrust plates, spreading members which are arranged between the two thrust plates and spread them apart when the thrust plates are turned with respect to each other, thereby initiating a braking with servo effect, and projections on the intermediate discs which cooperate with projections of the thrust plates for increasing the servo effect thereof.

In a known full plate disc brake of this type (DE No. 2104072 C3) the two stops fixed with respect to the housing are formed by two sides of a cylindrical pin. Each intermediate disc comprises a projection cooperating with a projection of the associated thrust plate. When a braking takes place in a predetermined direction of rotation the brake discs of one set exert corresponding torques on the thrust plate and the intermediate discs. A torque is transmitted from one of the two intermediate discs to the associated thrust plate. After initial turning through a small angle one of the two thrust plates is restricted by the housing-fixed stop associated thereon from turning further. The torque which is transmitted in the given direction of rotation to the other thrust plate by the intermediate disc associated therewith supports the servo effect of the brake in known manner. However, part of this desired torque is lost on the way from the respective intermediate disc to the associated thrust plate because said intermediate disc tends to tilt about its projection with which it bears on the corresponding projection of the associated thrust plate. Although such a tiling is prevented by the inner guide surfaces of the housing considerable frictional resistances occur which reduce the useful torque which is transmitted by said intermediate disc to the associated thrust plate. In addition, the friction occurring at the inner guide surfaces of the housing hampers axial displacement of the respective intermediate disc and this also impairs the desired increase in the braking forces.

The invention is based on the problem of further developing a full plate disc brake equipped with intermediate discs for increasing the servo effect in such a manner that for a given direction of rotation of the brake discs the torque exerted by the latter on one of the intermediate discs is imparted substantially unreduced to the associated thrust plate for increasing the servo action thereof.

Proceeding from a full plate disc brake of the type described at the beginning this problem is solved in accordance with the invention in that each of the two intermediate discs comprises at least two projections which are arranged offset with respect to each other at at least approximately equal angular intervals and are each associated with a projection of the associated thrust plate in such a manner that each intermediate disc can transmit to the associated thrust plate solely moments in the direction of rotation in which the lug of the respective thrust plate moves away from the associated stop fixed with respect to the housing.

The arrangement of two or more projections on each intermediate disc achieves that in each of the two possible directions of rotation the intermediate disc which is to intensify the servo effect of the thrust plate associated therewith bears on said thrust plate in such a manner that the inner guide surfaces of the housing have to transmit only very small guide forces, if any at all, to said intermediate disc. The torque which said intermediate disc receives from the adjacent brake discs is thus passed on almost completely to the associated thrust plate. In contrast, the other intermediate disc transmits the useless torque acting thereon in the given direction of rotation directly to the housing and not to the thrust plate associated with said disc and consequently said thrust plate need only be supported by the housing-fixed stop associated therewith against the torque acting on said thrust plate itself. As a result the necessary axial displacement of said thrust plate is not made unnecessarily more difficult by the associated housing-fixed stop. Thus, on the whole appreciable friction losses are avoided and this is favourable for the servo action and has the additional advantageous effect that the wear at the cooperating stop faces is kept small.

Generally it suffices for each of the two intermediate discs to have two projections which each cooperate with a projection of the associated thrust plate and lie diametrically opposite each other.

It is advantageous for each of the two intermediate discs to have at least one additional projection with which a housing-fixed stop is associated to limit a rotation of the respective intermediate disc away from the projections associated therewith of the associated thrust plate.

If the brake according to the invention, like the known full plate disc brake described above, comprises a mechanical actuator then said actuator may comprise a sleeve which projects radially into the housing and on which are formed two housing-fixed stops each for a lug of the two thrust plates and in which an actuating shaft is rotatably mounted which is connected to said two lugs via an actuating rod in each case. With such an actuator depending on the direction of rotation of the brake discs the one or other actuating rod must take up a reaction force of the thrust plate which operates without servo effect for the given direction of rotation. However, it is achieved with these steps according to the invention that said reaction force only corresponds to the torque which acts on the respective thrust plate operating without servo effect itself and is not increased by the moments acting on the associated intermediate disc.

The invention can be further developed in that diametrically opposite the mechanical actuator a hydraulic actuator is arranged which comprises a housing-fixed cylinder and two pistons oppositely operable therein which each act on a further lug of the first and second thrust plate respectively.

Finally, this embodiment can be further developed in that on the two lugs of each of the two thrust plates an axial projection is arranged for cooperation with a radial projection of the associated intermediate discs.

Figure 2:
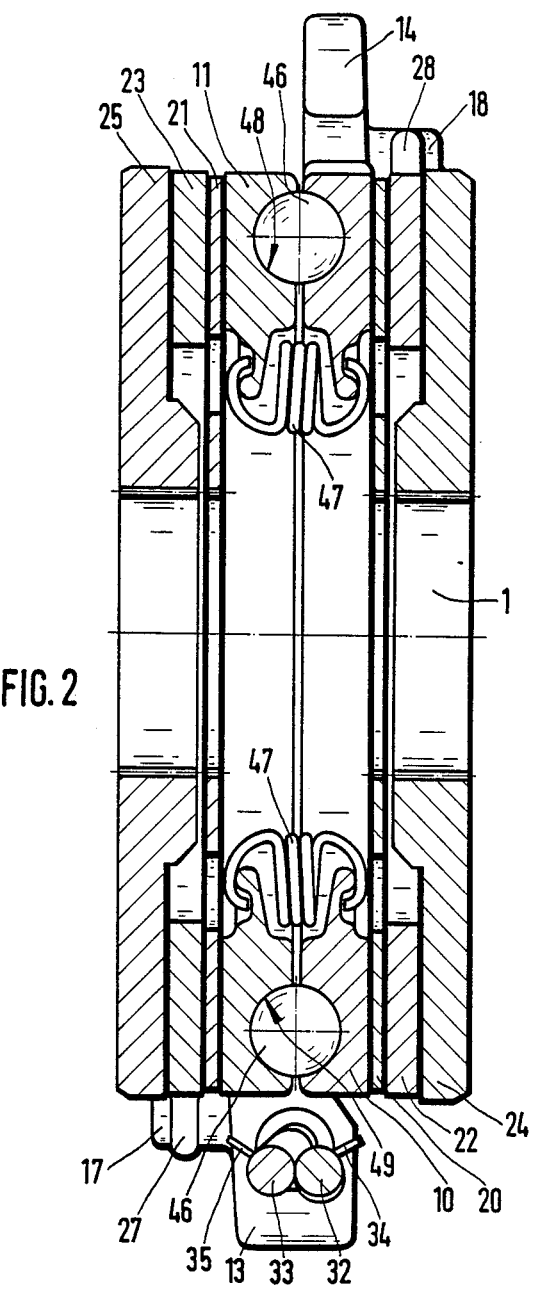
Figure 3:
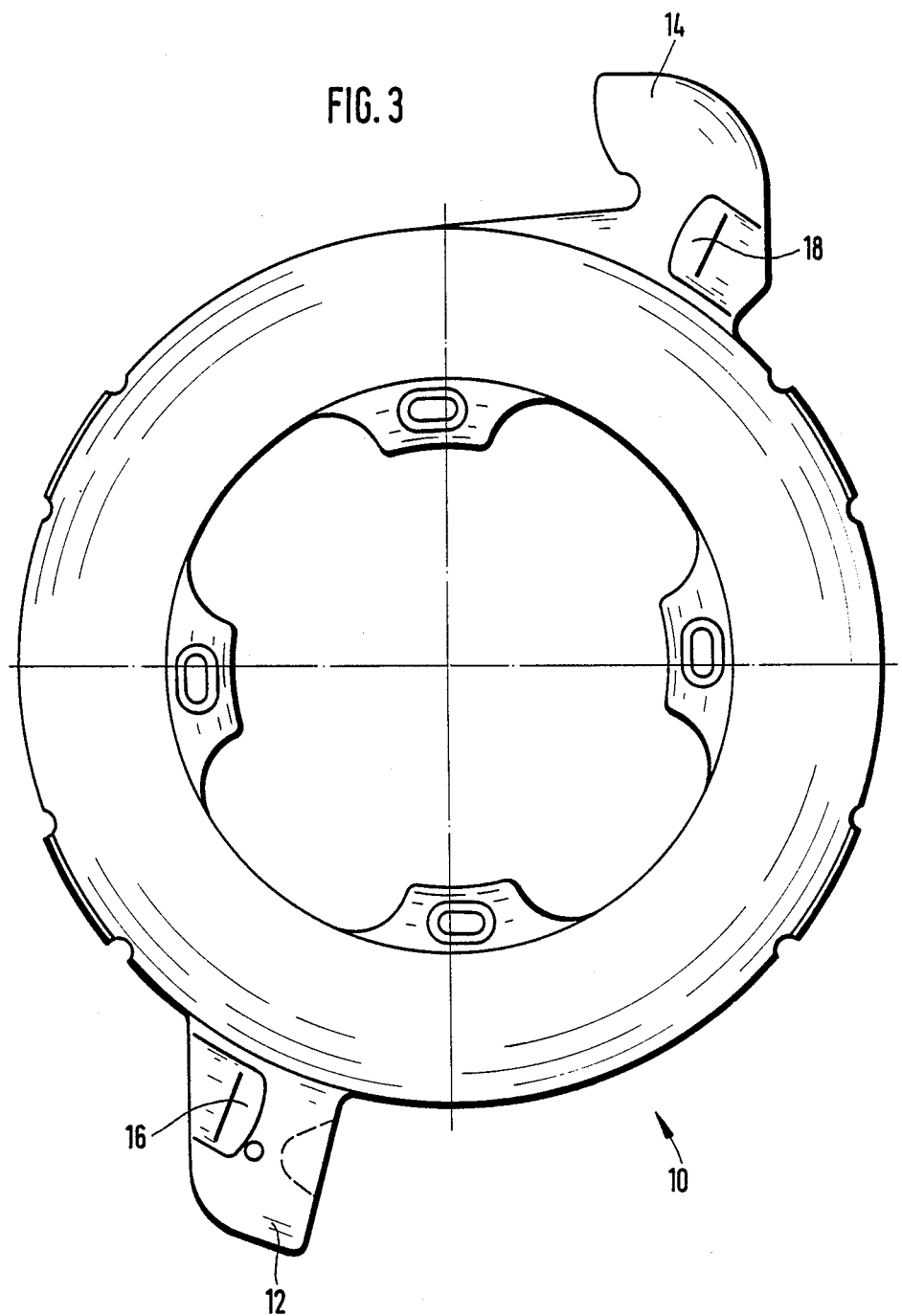
Figure 4:
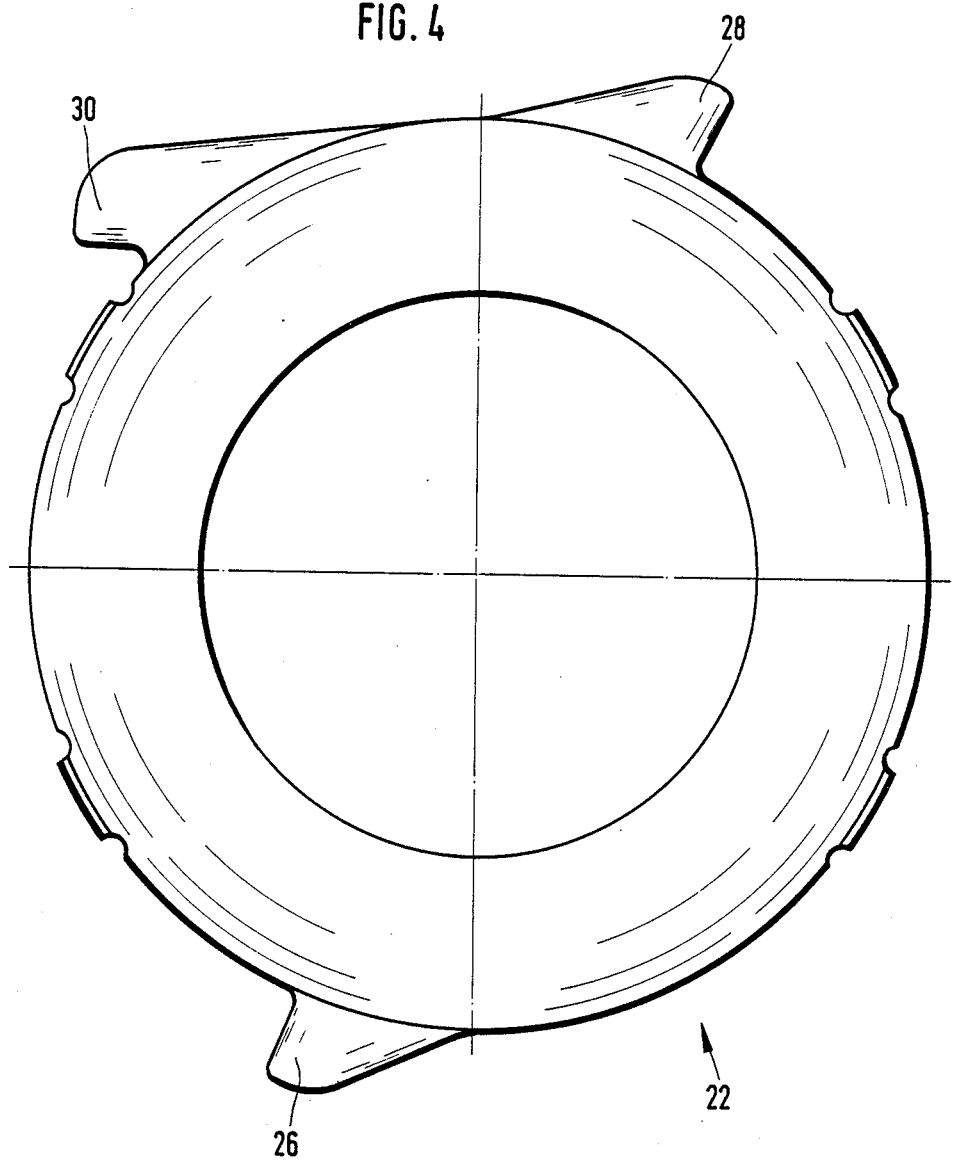

An example of embodiment will be explained hereinafter with further details of the invention with the aid of the schematic drawings, wherein:

FIG. 1 is a view shown partially in section in a radial plane of a full plate disc brake according to the invention, FIG. 2 is the axial section II—II of FIG. 1, FIG. 3 is a view of a thrust plate and FIG. 4 is a view of an intermediate disc.

The brake illustrated is arranged on a shaft 1 of which only the geometrical axis is shown. The shaft 1 may for example be a rear axle halfshaft of a tractor having a full plate disc brake on each of the two halfshafts.

The brake shown comprises a housing 2 having three arcuate inner guide surfaces 3, 4 and 5, of which the guide surface 5 is considerably longer than the guide surfaces 3 and 4 and lies diametrically opposite the latter. At the end of the guide surface 4 remote from the guide surface 3 the housing 2 comprises a stop 6 and a corresponding stop 7 is formed symmetrically therewith at an end of the guide surface 5. A mechanical actuator 8 and a hydraulic actuator 9 are installed as separate components into the housing 2 diametrically opposite each other.

At the guide surfaces 3, 4 and 5 a first thrust plate 10 and a second thrust plate 11 are guided in such a manner that they are centred with respect to the geometrical axis of the shaft 1 and can rotate about said axis and move axially. The thrust plates 10 and 11 have a first and second radially projecting lug 12 and 13 respectively which are arranged on either side of the mechanical actuator 8 and a further radial projecting lug 14 and 15 respectively arranged on either side of the hydraulic actuator 9. On each of the lugs 12 and 13 an axial projection 16, 17, 18 and 19 respectively is formed; each of these projections extends axially outwardly so that the projections of each thrust plate are directed away from the projections of the other thrust plate.

In the example illustrated the axial projections 16 to 19 are made in one piece from cast steel with the associated lugs 12, 13, 14 and 15 and the associated thrust plate 10 and 11 respectively; the axial projections 16 and 19 may however for example also be formed each by an axis-parallel pin which is screwed into the associated lug. The two thrust plates 10 and 11 are identical but installed laterally inverted into the housing 2.

Here and in the following description parts of the first thrust plate 10 and parts particularly associated therewith have even reference numerals whilst parts of the second thrust plate 11 and parts particularly associated therewith have odd reference numerals.

Directly adjacent the first thrust plate 10 on the side thereof remote from the second thrust plate 11 a first axially inner brake disc 20 is disposed; in corresponding manner directly adjacent the second thrust plate 11 a second axially inner brake disc 21 is disposed. Further to the outside axially the brake disc 20 is adjoined by a first intermediate disc 22 and the brake disc 21 by a second intermediate disc 23. This is followed on the one side by a first axially outer brake disc 24 and on the other side by a second axially outer brake disc 25. Thus, each of the two intermediate discs 22 and 23 is disposed between two brake discs 20 and 24, and 21 and 25, respectively.

The two intermediate discs 22 and 23 are identical to each other but installed laterally inverted in the housing 2. The axially inner brake discs 20 and 21 are completely identical; likewise, the axially outer brake discs 24 and 25 are identical.

The intermediate discs 22 and 23 are guided rotatably and axially displaceably at the guide surfaces 3, 4 and 5 of the housing 2. The axially inner brake discs 20 and 21 are connected to the shaft 1 for rotation therewith but are axially displaceable, for example by multigroove profiles. The axially outer brake discs 24 and 25 are also connected to the shaft 1 for joint rotation therewith, for example by multigroove profiles, but are prevented from being axially displaced with respect to the shaft 1 by securing elements of usual type.

The intermediate disc 22 has two diametrically opposite radial projections 26 and 28 which after overcoming a small clearance in one and only one direction, clockwise in FIG. 1, are able to transmit tangential forces to the axial projection 16 and 18 of the first thrust plate 10. In corresponding manner on the second intermediate disc 23 diametrically opposite radial projections 27 and 29 are formed which after overcoming a small clearance in the opposite direction of rotation, i.e. anticlockwise in FIG. 1, are able to transmit tangential forces to the axial projections 17 and 19 of the second thrust plate 11.

The ability of the first intermediate disc 22 to rotate with its radial projections 26 and 28 away from the associated radial projections 16 and 18 of the first thrust plate is limited by an additional radial projection 30 which after a small rotation strikes the housing-fixed stop 6. In corresponding manner the ability of the second intermediate disc 23 to turn with its radial projections 27 and 29 away from the associated axial projections 17 and 19 of the second thrust plate 11 is limited by an additional radial projection 31 associated with the housing-fixed stop 7.

The mechanical actuator 8 includes two pushrods 32 and 33 each connected by a holding spring 34, 35 to the lug 12 of the first thrust plate 10 and the lug 13 of the second thrust plate 11 respectively and engaging with one end in a trough in the associated lug. Each of the two pushrods 32 and 33 engages with its other end in a trough of an actuating shaft 36 which extends radially of the shaft 1 to be retarded and is rotatably mounted in a correspondingly radially arranged sleeve 37 secured to the housing 2.

The actuating shaft 36 is connected to the sleeve 37 by a return spring 38 which tends to hold the actuating shaft and, through the agency of the pushrods 32, 33 and holding springs 34, 35, also the thrust plates 10 and 11 in their rest position shown in FIG. 1. Secured to an end of the actuating shaft 36 projecting from the sleeve is an actuating lever 39 which can be connected via a linkage or the like, not shown, to a handbrake lever. A portion of the sleeve 37 projecting into the housing 2 forms two stops 40 and 41, facing away from each other, for the lug 12 of the first thrust plate 10 and the lug 13 of the second thrust plate 11.

The hydraulic actuator 9 arranged diametrically opposite the mechanical actuator 8 includes a connecting member 42 which is mounted on the housing 2 and to which a double-action cylinder 43 is secured. The cylinder 43 extends in a direction tangential to the thrust plates 10 and 11 and includes two pistons 44 and 45 which face away from each other and on which the lug 14 of the first thrust plate 10 and the lug 15 of the second thrust plate 11 bear.

The two thrust plates 10 and 11 and spreading members 46 disposed therebetween are tensioned together by tension springs 47 in the axial direction. The spreading members 46 in the example illustrated are balls which are received in ramp-like recesses 48 and 49 arranged opposite each other in pairs in the thrust plates 10 and 11.

In a normal operating braking the two pistons 44 and 45 are moved apart by brake fluid introduced into the cylinder 43 so that they press the lugs 14 and 15 away from each other and thus turn the two thrust plates 10 and 11 with respect to each other. As a result the thrust plates 10 and 11 are spread apart in the axial direction by the spreading members 46 so that each of the thrust plates presses the discs adjacent it against each other, i.e. the brake disc 20, the intermediate disc 22 and the brake disc 24 on the one side and the brake disc 21, the intermediate disc 23 and the brake disc 25 on the other side.

For example, when the shaft 1 rotates clockwise, as seen in FIG. 1, firstly the two thrust plates 10 and 11 and the two intermediate discs 22 and 23 are entrained by the adjacent brake discs clockwise until after overcoming a small play the lug 13 of the thrust plate 11 strikes the associated stop 41 and after overcoming a somewhat greater play, thus somewhat later, the additional radial projection 31 of the intermediate disc 23 strikes the stop 7. The thrust plate 11 and the intermediate disc 23 are then only axially displaceable whilst the thrust plate 10 is further entrained clockwise by the brake discs 20 adjacent it and consequently is pressed further by the spreading member 46 in the axial direction away from the thrust plate 11. Thus, the braking moment acting on the thrust plate 10 is converted in a certain ratio defined by the ramp angles of the recesses 48 and 49 to an additional axial force; a servo effect thus arises at the thrust plate 10.

The servo effect is intensified by the two radial projections 26 and 28 of the somewhat further rotating intermediate disc 22 bearing on the associated axial projection 16 and 18 respectively of the thrust plate 10 and transmitting to said projections practically the entire torque exerted by the two adjacent brake discs 24 and 26 on the intermediate disc 22. This torque transmission is not restricted, or restricted only to a negligible degree, by the friction of the intermediate disc 22 at a guide surfaces 3, 4 and 5 of the housing because the intermediate disc 22 due to its symmetrical support via its diametrically opposite radial projections 26 and 28 requires little or no additional support from any of the guide surfaces 3, 4 or 5.

The process is a corresponding one in the opposite direction of rotation of the shaft 1 to be retarded, the thrust plates 10 and 11 playing interchanged parts and the same applying to the intermediate discs.

If instead of the hydraulic actuator 9 the mechanical actuator 8 is to be used, the actuating shaft 36 is turned by means of the actuating lever 39 in such a manner that the two actuating rods 32 and 33 press the lugs 12 and 13 apart. As a result the thrust plates 10 and 11 are again turned with respect to each other and consequently axially spread apart. If it is now assumed that the shaft 1 to be retarded rotates clockwise as seen in FIG. 1 so that the thrust plates 10 and 11 and the intermediate discs 22 and 23 are entrained clockwise, then the lug 13 exerts on the associated actuating rod 33 a force which depends only on the torque acting on the thrust plate 11 and is not increased by the torque acting on the associated intermediate disc 23. For the intermediate disc 23 again bears with its additional projection 31 on the housing-fixed stop 7.

Thus, the load on the actuating rod 33 on rotation of the shaft 1 clockwise is only as large as it would be if the intermediate disc 23 were not present. The other actuating rod 32 is relieved by the servo effect occurring at the thrust plate 10 and intensified by the intermediate disc 22. The torque which must be applied for mechanical actuation by means of the actuating lever 39 is thus less than it would be if the intermediate disc 22 were not present. This applies accordingly to the opposite direction of rotation of the shaft, with the difference that the parts played by the actuating rods 32 and 33 are interchanged.

We claim:

1. Full plate disc brake, in particular for tractors, comprising a housing (2) having inner guide surfaces (3, 4, 5), at least one first and one second stop (40, 41) fixed with respect to the housing, a first and a second thrust plate (10, 11) guided rotatably and axially displaceably at the guide surfaces (3, 4, 5) of the housing (2), a first lug (12) on the first thrust plate (10) which limits the rotation thereof in one direction of rotation in that it strikes the first stop (40), a second lug (13) on the second thrust plate (11) which limits the rotation thereof in the opposite direction of rotation in that it strikes the second stop (41), a first and a second set of brake discs (20, 24; 21, 25) which are arranged adjacent the first and second thrust plate (10, 11) respectively, a first and a second intermediate disc (22, 23) which are arranged between the brake discs (20, 24; 21, 25) of the first and second set respectively and are likewise rotatably and axially displaceably guided at the guide surfaces (3, 4, 5) of the housing (2), at least one actuator (8) for opposite rotation of the two thrust plates (10, 11), spreading members (46) which are arranged between the two thrust plates (10; 11) and spread them apart when the thrust plates are turned with respect to each other, thereby initiating a braking servo effect, and projections (26, 28; 27, 29) on the intermediate discs (22, 23) which cooperate with projections (16, 18; 17, 19) of the thrust plates (10, 11) for increasing the servo effect thereof, characterized in that each of the two intermediate discs (22, 23) comprises at least two projections (26, 28; 27, 29) which are arranged offset with respect to each other at at least approximately equal angular intervals and are each associated with a projection (16, 18; 17, 19) of the associated thrust plate (10; 11) in such a manner that each intermediate disc (22, 23) can transmit to the associate thrust plate (10; 11) moments solely in the direction of rotation in which the lug (12; 13) of the respective thrust plate (10; 11) moves away from the associated stop (40; 41) fixed with respect to the housing.

2. Full plate disc brake according to claim 1, characterized in that each of the two intermediate discs (22, 23) has two projections (26, 28; 27, 29) which each cooperate with a projection (16, 18; 17, 19) of the associated thrust plate (10, 11) and lie diametrically opposite each other.

3. Full plate disc brake according to claim 1 or 2, characterized in that each of the two intermediate discs (22, 23) has at least one additional projection (30; 31) with which a housing-fixed stop (6; 7) is associated to limit a rotation of the respective intermediate disc (22; 23) away from the projections (16, 18; 17, 19) associated therewith of the associated thrust plate (10; 11).

4. Full plate disc brake according to claim 3, comprising a mechanical actuator (8), characterized in that the mechanical actuator (8) comprises a sleeve (37) which projects radially into the housing (2) and on which are formed two housing-fixed stops (40, 41) each for a lug (12; 13) of the two thrust plates (10, 11) and in the sleeve (37) an actuating shaft (36) is rotatably mounted which is connected to said two lungs (12, 13) via an actuating rod (32, 33) in each case.

5. Full plate disc brake according to claims 1 or 2 comprising a mechanical actuator (8), characterized in that the mechanical actuator (8) comprises a sleeve (37) which projects radially into the housing (2) and on which are formed two housing-fixed stops (40, 41) each for a lug (12; 13) of the two thrust plates (10, 11) and in the sleeve (37) an actuating shaft (36) is rotatably mounted which is connected to said two lugs (12, 13) via an actuating rod (32; 33) in each case.

6. Full plate disc brake according to claim 5, characterized in that diametrically opposite the mechanical actuator (8) a hydraulic actuator (9) is arranged which comprises a housing-fixed cylinder (43) and two pistons (44, 45) oppositely operable therein which each act on a further lug (14; 15) of the first and second thrust plate (10; 11) respectively.

7. Full plate disc brake according to claim 6, characterized in that on the two lugs (12, 14; 13, 15) of each of the two thrust plates (10; 11) an axial projection (16, 18; 17, 19) is arranged for cooperation with a radial projection (26, 28; 27, 29) of the associated intermediate discs (22; 23).

* * * * *